US010995277B2

(12) United States Patent
Cross et al.

(10) Patent No.: US 10,995,277 B2
(45) Date of Patent: May 4, 2021

(54) SYSTEM AND METHOD OF PREDICTIVE ANALYTICS FOR CONTROL OF AN OVERHEAD CRUDE SECTION OF A HYDROCARBON REFINING PROCESS

(71) Applicant: BL TECHNOLOGIES, INC., Minnetonka, MN (US)

(72) Inventors: Collin Wade Cross, Spring, TX (US); Zhaoyang Wan, Trevose, PA (US)

(73) Assignee: BL TECHNOLOGIES, INC., Minnetonka, MN (US)

(*) Notice: Subject to any disclaimer, the term of this patent is extended or adjusted under 35 U.S.C. 154(b) by 314 days.

(21) Appl. No.: 15/781,269

(22) PCT Filed: Dec. 2, 2016

(86) PCT No.: PCT/US2016/064532
§ 371 (c)(1),
(2) Date: Jun. 4, 2018

(87) PCT Pub. No.: WO2017/096109
PCT Pub. Date: Jun. 8, 2017

(65) Prior Publication Data
US 2018/0355258 A1 Dec. 13, 2018

Related U.S. Application Data

(60) Provisional application No. 62/263,242, filed on Dec. 4, 2015.

(51) Int. Cl.
*C10G 7/12* (2006.01)
*G05B 19/4155* (2006.01)
(Continued)

(52) U.S. Cl.
CPC ............ *C10G 7/12* (2013.01); *C10G 7/10* (2013.01); *C10G 31/08* (2013.01); *G05B 19/4155* (2013.01); *G05B 2219/32287* (2013.01)

(58) Field of Classification Search
CPC . C10G 7/10; C10G 31/08; C10G 7/12; G05B 2219/32287; G05B 19/4155
See application file for complete search history.

(56) References Cited

U.S. PATENT DOCUMENTS

| 5,302,253 A | 4/1994 | Lessard et al. |
| 5,425,267 A * | 6/1995 | Herrmann ............ G01N 17/00 422/53 |

(Continued)

FOREIGN PATENT DOCUMENTS

| JP | H0782572 | 3/1995 |
| WO | 2017023795 | 2/2017 |

OTHER PUBLICATIONS

Office Action dated Aug. 27, 2019, issued in related Chile Application No. 1454-2018, and Machine Translation of same, 21 pages.
(Continued)

*Primary Examiner* — Shogo Sasaki
(74) *Attorney, Agent, or Firm* — Meunier Carlin & Curfman LLC

(57) ABSTRACT

Described herein are systems and methods for control of an overhead crude section of a hydrocarbon refining process. In one aspect, the method comprises monitoring a plurality of operating conditions of an overhead crude section of a refinery; determining hydrogen chloride and amine conditions of the overhead crude section of the refinery at current operating conditions of the overhead crude section; determining a plurality of fields of action by simulating a variation of one or more of the plurality of conditions; determining a risk indicator of salting for each of the plurality of
(Continued)

fields of action; and providing a recommended change in operation of the overhead crude section to one of the plurality of fields of action while adhering to one or more constraints.

14 Claims, 14 Drawing Sheets

(51) Int. Cl.
C10G 7/10 (2006.01)
C10G 31/08 (2006.01)

(56) References Cited

U.S. PATENT DOCUMENTS

| 5,503,006 | A | * | 4/1996 | Babaian-Kibala | G01N 17/00 73/86 |
| 8,177,962 | B2 | * | 5/2012 | Koizumi | C23F 11/10 208/47 |
| 9,150,793 | B2 | * | 10/2015 | Scattergood | C10G 7/12 |
| 9,477,238 | B2 | * | 10/2016 | Keizer | E21B 47/10 |
| 2009/0149981 | A1 | * | 6/2009 | Evans | G05B 23/0254 700/110 |
| 2010/0108566 | A1 | * | 5/2010 | Scattergood | C10G 7/12 208/47 |
| 2012/0053861 | A1 | * | 3/2012 | Kremer | C10G 75/02 702/50 |

OTHER PUBLICATIONS

Dion, M. et al. "Operating philosophy can reduce overhead corrosion", Hydrocarbon Processing, vol. 91, No. 3, Mar. 2012, pp. 45-47.
Payne, B. "Minimise corrosion while maximising distillate", PTQ—Petroleum Technology Quarterly, 2012, pp. 75-81.
GE Power & Water "APAC Refinery Reduces Risk of Crude Tower Failure with GE's LoSALT* Modeling and Subsequent Treatment", GE Case Study, Jul. 2014, pp. 1-3.
Elnour, M.M. et al. "The Effects of High HCl and Changes in pH Levels in CDU Overhead Corrosion", Journal of Applied and Industrial Sciences, 2014, 2 (5): 238-243.
GE Water & Process Technology "An Integrated Approach to Optimizing Corrosion Control for Refinery Process and Boiler Systems (Replay)", Youtube, Nov. 26, 2014.
Thornthwaite, P. "Monitoring and simulation resolves overhead corrosion", PTQ—Petroleum Technology Quarterly, Mar. 31, 2016.
International Search Report and Written Opinion dated Mar. 6, 2017, from International Application No. PCT/US2016/064532, 20 pages.
Office Action issued for Chilean Application No. 1454-2018, dated Sep. 23, 2019.
Communication Pursuant to Article 94(3) EPC, issued for European Application No. 16813286.8, dated Apr. 28, 2020.
Office Action relating to EP Application No. 16813286.8, dated Dec. 22, 2020.

* cited by examiner

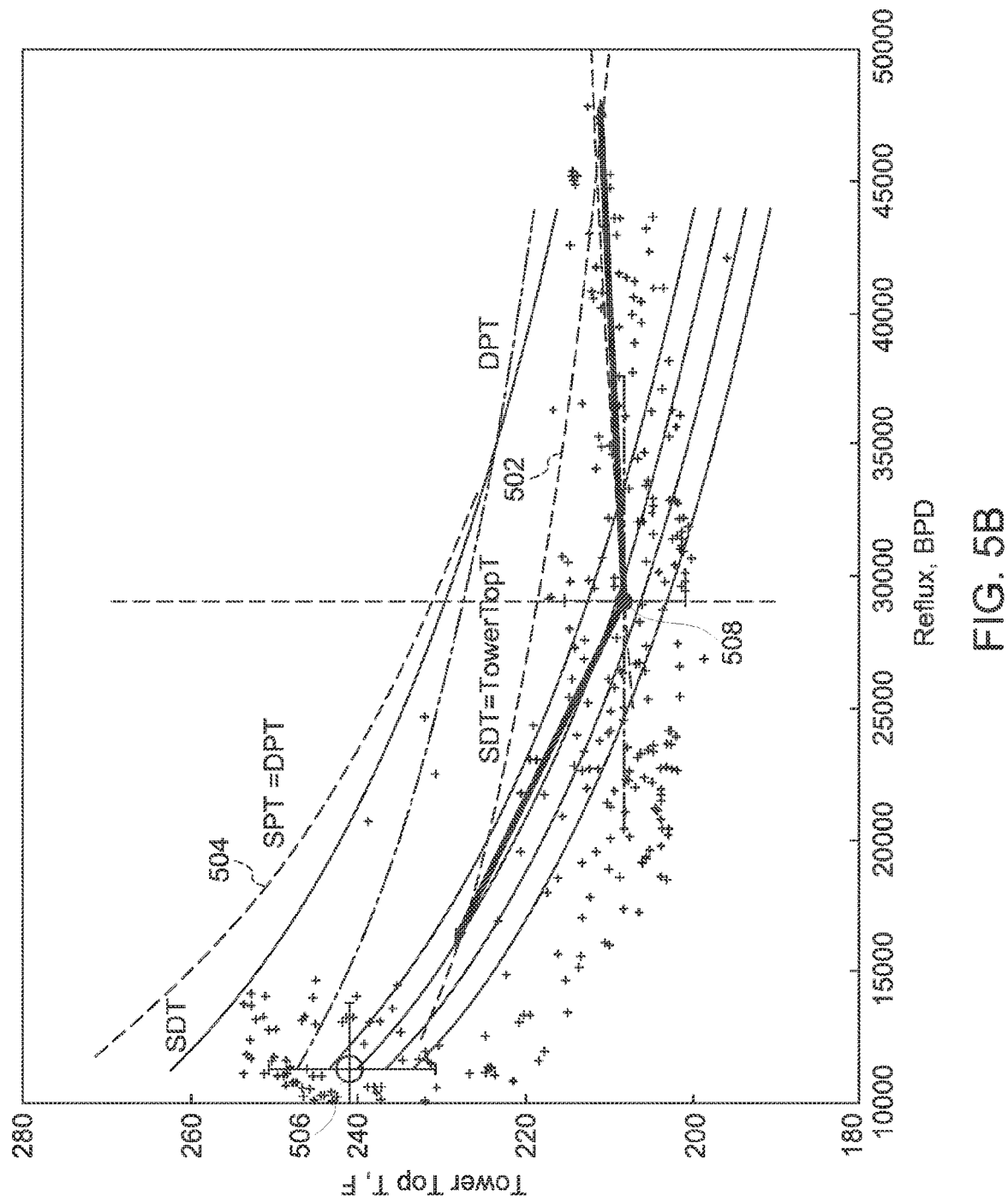

SYSTEM AND METHOD OF PREDICTIVE ANALYTICS FOR CONTROL OF AN OVERHEAD CRUDE SECTION OF A HYDROCARBON REFINING PROCESS

CROSS REFERENCE TO RELATED APPLICATION

This application claims priority to and benefit of U.S. Provisional Patent Application Ser. No. 62/263,242 filed Dec. 4, 2015, which is fully incorporated by reference and made a part hereof.

BACKGROUND

The majority of hydrocarbons found on earth naturally occur in crude oil, where decomposed organic matter provides an abundance of carbon and hydrogen which, when bonded, can concatenate to form seemingly limitless chains. Hydrocarbons can be refined in a refining process to produce products such as gasoline, diesel fuel, paraffin wax, and the like. The refining process can include a tank-farm, a cold preheat train, a desalter, a hot preheat train, a crude heater/furnace, a crude distillation unit, a vacuum unit furnace, a vacuum distillation unit, and downstream processing units such a hydrotreater, a hydrocracker, fluid catalytic cracking (FCC), a visbreaker, a coker, etc.

Sustained growth in the demand for jet fuel, diesel and other middle distillate products is expected to have a continuing impact on unit operations, product pricing, product selection and refining margins into the foreseeable future. As more and more new facilities come online to supply the demand for tighter product Sulphur specifications, refiners will continue to maximize distillate production in their atmospheric distillation units to take advantage of favorable product pricing. However, maximizing the production of these fuel streams requires a continual assessment of the entire processing system beyond the mechanical capability of pumps, piping and valves to ensure reliable operation of the unit in a market environment that favors distillate production. As refineries continue to lower tower top temperatures in an effort to increase product draws in the distillate sections of the column, the conditions for introducing salt fouling and corrosion mechanisms into areas that previously were not affected come to the forefront. Refiners must address the hazards of unmonitored distillate maximization on corrosion in the crude distillation column top section and overhead system.

Crude unit overhead corrosion deals with corrosion affecting the upper sections of the crude unit atmospheric fractionation column, including the top tower trays, overhead condenser system and top pumparound circuits. Corrosion in the crude unit overhead system is primarily due to acid attack at the initial water condensation point (ICP), resulting in low pH conditions and the associated aggressive corrosion of the system's metal surfaces. Secondary corrosion mechanisms in the tower top and overhead are typically due to amine-chloride salt deposition driving under-deposit corrosion. Neutralizers are used to control the pH of condensing overhead waters within an optimal range to maximize the reduction of corrosion rates while minimizing the tendency for salt deposition caused by the neutralization reaction with the acidic species. The type of neutralizer used in an overhead system is selected based on three primary factors: neutralization capacity (the strength of the neutralizer), the water partition coefficient (the rate at which it will enter the first water droplets formed in the overhead system) and the neutralizer's salt point.

The salt point is defined as the temperature at which the first neutralization salts begin to precipitate from the vapor phase. These salts can be very corrosive themselves and can also give rise to under-deposit corrosion at certain points in the system. In order to control the deposition and corrosivity of these salts, a water wash is often used to provide a means of diluting and washing the corrosive salts from the overhead system. In these cases, the salts are scrubbed from the overhead vapor, washed from the overhead piping and condenser system, and flow into the overhead receiver. However, as the overhead process temperature is lowered in an effort to force additional material into the distillate draw section of the column, the location of the salt point temperature moves further upstream into the overhead line, pumparound circuits and tower top internals where there is no water wash. Without the means of removing deposited salts in these areas, corrosion can be severe and equipment failure rapid. Therefore, it is critical to continuously re-evaluate the neutralizer being used to determine if it is still appropriate for changes in overhead and operating conditions. The ideal neutralizer for the system will form its amine chloride salt at a temperature that is 15° F. (8° C.) lower than the water dew point in the system. To protect against the deposition of precipitated amine-chloride salts inside of the distillation column, the neutralizer salt point temperature must also be 25° F. (14° C.) lower than the tower top temperature.

Chloride control in the overhead system is one of the aspects of a good corrosion control program. This is because altering chloride levels has the largest overall impact on the corrosion potential by dramatically affecting both pH and the salt point deposition temperatures. The lower chloride levels entering the distillation column are, the greater the degree of corrosion control that is possible from a treatment program. Therefore, with the desalter having the greatest impact on the condition of the charge to the distillation tower, all efforts should be made to ensure optimal desalter performance, reducing desalted crude chlorides to the lowest possible levels. However, maintaining low chlorides alone is not sufficient to guarantee good overhead corrosion control. The amines present in the system are equally important to the overhead system's fouling and corrosion potential. Neutralizing amines that are intentionally added to control overhead pH conditions are not the only amine species that play a role in overhead salt formation. The presence of tramp amines may play a larger role in undesired salt formation in the overhead and tower top than the injected neutralizer amines. Tramp amines are broadly defined as any amines, other than the appropriate neutralizer being used, found cycling in the system. Tramp amines that are entering and recycling in the system will strongly affect overhead pH and typically have very high salt points. Sources of these tramp amines include incoming crude and slop oils, steam neutralizers, alkanol amine units, sour water strippers, H2S scavengers and cold wet reflux. Such amines can make it virtually impossible to either keep salt points below the water dew point or to drop pH to desirable levels. The most desirable condition is to have overall tramp amines in the system low enough to enable the usage of a quality neutralizer with a low salt point. If tramp amine levels are high enough, the net system salt point can negate the impact of a quality neutralizer. This situation can cause salt point temperatures to exceed the tower top temperature and cause various deposition problems that can become quite severe and affect tower operation and charge rates. Efforts should always be taken to understand total amine loading. Both elevated chloride levels and amine levels will negatively impact overhead corrosion due to salt point effects. While chloride control is a relatively direct and straightforward effort, lowering levels of tramp amines can be much more difficult. This is often because operational practices prevailing in the refinery will give rise to high levels of tramp amines cycling up in the crude unit overhead. These practices are often caused by units outside the crude unit boundary. Four primary sources of tramp amine entry are the sour water stripper, steam production, alkanolamine scrubbing units, and amines entering the refinery with the incoming crude oil. An overall understanding of tramp amine backgrounds, surges and sources is necessary to enable targets and intervention for control of these species. Levels as low as 5 ppm of certain tramp amines can have a dramatic impact on salt points and associated corrosion. FIG. 1 illustrates typical tramp amine cycles. The tendency for all these amines to cycle up in the system is largely driven by overhead receiver pH and desalter effluent brine pH. As the pH rises above 5.5, the tendency for these species to cycle up is substantially increased. This is because the partitioning rate at which amines migrate from the hydrocarbon to the water phase are strongly influenced by pH. Once cycled up, the rate at which amines will blow down is dependent on the pH of both the desalter effluent brine and the overhead receiver waters, as well as the relative rate of amine input. A lower pH will cause a faster blow-down at a constant input of amines to the recycling system. The dynamic aspects of amines having reduced partitioning rates, reduced recycling rates and increased blow-down rates as pH is lowered has important consequences.

Therefore, a system and method that dynamically uses overhead corrosion control strategies to help refiners maintain reliable unit operation while maximizing distillate production is desired.

BRIEF DESCRIPTION

Disclosed herein are systems and methods of using predictive analytics for operating an overhead crude section in a hydrocarbon refining process to maximize production while minimizing operating risk caused by salting.

In one aspect, a method of dynamically using predictive analytics for operating an overhead crude section in a hydrocarbon refining process is described. This method comprises determining one or both of hydrogen chloride and amine conditions of an overhead crude section of a refinery at current operating conditions of the overhead crude section, wherein the current operating conditions comprise one or more operating conditions; determining a plurality of fields of action by simulating a variation of at least one of the one or more operating conditions; determining a risk indicator of salting for each of the plurality of fields of action; and providing a recommended change in operation or chemistry of the overhead crude section to one of the plurality of fields of action while adhering to one or more constraints.

In one embodiment of the method, providing a recommended change in operation or chemistry of the overhead crude section to one of the plurality of fields of action while adhering to one or more constraints comprises providing a recommended change in one or both of HCl and amine conditions of the overhead crude section.

In one embodiment of the method, the one or more constraints involve salting temperature, water dew point temperature and tower top temperature of the overhead crude section.

In one embodiment of the method, the salting temperature is constrained to be less than the water dew point temperature and tower top temperature.

In one embodiment of the method, the overhead crude section comprises a distillation column and the one or more operating conditions comprise one or more of the distillation column's operating conditions.

In one embodiment of the method, the distillation column's one or more operating conditions comprise one or more of overhead condenser temperature, overhead condenser pressure, reflux flow and steam flow.

In one embodiment of the method, the one or more operating conditions comprise one or more of industrial fluid properties or boot water properties of the overhead crude section.

In one embodiment of the method, the industrial fluids comprise one or more of a refinery fluid, a production fluid, cooling water, process water, drilling fluids, completion fluids, production fluids, crude oil, feed streams to desalting units, outflow from desalting units, refinery heat transfer fluids, gas scrubber fluids, refinery unit feed streams, refinery intermediate streams, finished product streams, and combinations thereof.

In one embodiment of the method, the one or more of industrial fluid properties or boot water properties of the overhead crude section comprise speciated amines, percent salt, chlorides, iron, and organic acids.

In one embodiment of the method, the amines are speciated using a multi-step ion-exchange chromatography method.

In one embodiment of the method, determining the plurality of fields of action by simulating a variation of at least one of the one or more operating conditions comprises using a physics model and probability distribution models on at least one of the one or more operating conditions and the determined hydrogen chloride and amine conditions.

In one embodiment of the method, the physics model and the probability distribution models used on the at least one of the one or more operating conditions and the determined hydrogen chloride and amine conditions are simulated at levels of production that differ from a first level of production encountered at the current operating conditions of the overhead crude section.

In one embodiment of the method, determining the risk indicator of salting for each of the plurality of fields of action comprises performing a Monte Carlo simulation on the variation of at least one of the one or more operating conditions as determined using the physics model and the probability distribution models.

In one embodiment, the method further comprises operating the crude overhead section in accordance with the recommended change in operation of the overhead crude section.

In one embodiment, the method further comprises displaying to an operator safe zones or safe boundaries for operating the overhead crude section.

In another aspect of the invention, a system for using predictive analytics for control of an overhead crude section of a hydrocarbon refining process is disclosed. The system comprises a memory, wherein the memory stores computer-readable instructions; and a processor communicatively coupled with the memory, wherein the processor executes the computer-readable instructions stored on the memory, the computer-readable instructions causing the processor to: determine one or both of hydrogen chloride and amine conditions of an overhead crude section of a refinery at current operating conditions of the overhead crude section, wherein the current operating conditions comprise one or more operating conditions; determine a plurality of fields of action by simulating a variation of at least one of the one or more operating conditions; determine a risk indicator of salting for each of the plurality of fields of action; and provide a recommended change in operation or chemistry of the overhead crude section to one of the plurality of fields of action while adhering to one or more constraints.

In one embodiment of the system, providing a recommended change in operation or chemistry of the overhead crude section to one of the plurality of fields of action while adhering to one or more constraints comprises providing a recommended change in one or both of HCl and amine conditions of the overhead crude section.

In one embodiment of the system, the one or more constraints involve salting temperature, water dew point temperature and tower top temperature of the overhead crude section.

In one embodiment of the system, the salting temperature is constrained to be less than the water dew point temperature and tower top temperature.

In one embodiment of the system, the overhead crude section comprises a distillation column and the one or more operating conditions comprise one or more of the distillation column's operating conditions.

In one embodiment of the system, the distillation column's one or more operating conditions comprise one or more of overhead condenser temperature, overhead condenser pressure, reflux flow and steam flow.

In one embodiment of the system, the one or more operating conditions comprise one or more of industrial fluid properties or boot water properties of the overhead crude section.

In one embodiment of the system, the industrial fluids comprise one or more of a refinery fluid, a production fluid, cooling water, process water, drilling fluids, completion fluids, production fluids, crude oil, feed streams to desalting units, outflow from desalting units, refinery heat transfer fluids, gas scrubber fluids, refinery unit feed streams, refinery intermediate streams, finished product streams, and combinations thereof.

In one embodiment of the system, the one or more of industrial fluid properties or boot water properties of the overhead crude section comprise speciated amines, percent salt, chlorides, iron, and organic acids.

In one embodiment of the system, the amines are speciated using a multi-step ion-exchange chromatography method.

In one embodiment of the system, determining the plurality of fields of action by simulating a variation of at least one of the one or more operating conditions comprises using a physics model and probability distribution models on at least one of the one or more operating conditions and the determined hydrogen chloride and amine conditions.

In one embodiment of the system, the physics model and the probability distribution models on at least one of the one or more operating conditions and the determined hydrogen chloride and amine conditions are simulated at levels of production that differ from a first level of production encountered at the current operating conditions of the overhead crude section.

In one embodiment of the system, determining the risk indicator of salting for each of the plurality of fields of action comprises performing a Monte Carlo simulation on the variation of at least one of the one or more operating conditions as determined using the physics model and the probability distribution models.

In one embodiment, the system further comprises operating the crude overhead section in accordance with the recommended change in operation of the overhead crude section.

In one embodiment, the system further comprises displaying to an operator safe zones or safe boundaries for operating the overhead crude section.

In yet another aspect, the invention comprises a non-transitory, computer-readable medium storing instructions that, when executed by a computer processor, cause the computer processor to perform a method using predictive analytics for control of an overhead crude section of a hydrocarbon refining process, the method comprising: determining one or both of hydrogen chloride and amine conditions of an overhead crude section of a refinery at current operating conditions of the overhead crude section, wherein the current operating conditions comprise one or more operating conditions; determining a plurality of fields of action by simulating a variation of at least one of the one or more operating conditions; determining a risk indicator of salting for each of the plurality of fields of action; and providing a recommended change in operation or chemistry of the overhead crude section to one of the plurality of fields of action while adhering to one or more constraints.

In one embodiment of the computer-readable medium, providing a recommended change in operation or chemistry of the overhead crude section to one of the plurality of fields of action while adhering to one or more constraints comprises providing a recommended change in one or both of HCl and amine conditions of the overhead crude section.

In one embodiment of the computer-readable medium, the one or more constraints involve salting temperature, water dew point temperature and tower top temperature of the overhead crude section.

In one embodiment of the computer-readable medium, the salting temperature is constrained to be less than the water dew point temperature and tower top temperature.

In one embodiment of the computer-readable medium, the overhead crude section comprises a distillation column and the one or more operating conditions comprise one or more of the distillation column's operating conditions.

In one embodiment of the computer-readable medium, the distillation column's one or more operating conditions comprise one or more of overhead condenser temperature, overhead condenser pressure, reflux flow and steam flow.

In one embodiment of the computer-readable medium, the one or more operating conditions comprise one or more of industrial fluid properties or boot water properties of the overhead crude section.

In one embodiment of the computer-readable medium, the industrial fluids comprise one or more of a refinery fluid, a production fluid, cooling water, process water, drilling fluids, completion fluids, production fluids, crude oil, feed streams to desalting units, outflow from desalting units, refinery heat transfer fluids, gas scrubber fluids, refinery unit feed streams, refinery intermediate streams, finished product streams, and combinations thereof.

In one embodiment of the computer-readable medium, the one or more of industrial fluid properties or boot water properties of the overhead crude section comprise speciated amines, percent salt, chlorides, iron, and organic acids.

In one embodiment of the computer-readable medium, the amines are speciated using a multi-step ion-exchange chromatography method.

In one embodiment of the computer-readable medium, determining the plurality of fields of action by simulating a variation of at least one of the one or more operating conditions comprises using a physics model and probability distribution models on at least one of the one or more operating conditions and the determined hydrogen chloride and amine conditions.

In one embodiment of the computer-readable medium, the physics model and the probability distribution models used on at least one of the one or more operating conditions and the determined hydrogen chloride and amine conditions are simulated at levels of production that differ from a first level of production encountered at the current operating conditions of the overhead crude section.

In one embodiment of the computer-readable medium, determining the risk indicator of salting for each of the plurality of fields of action comprises performing a Monte Carlo simulation on the variation of at least one of the one or more operating conditions as determined using the physics model and the probability distribution models.

In one embodiment, the computer-readable medium further comprises operating the crude overhead section in accordance with the recommended change in operation of the overhead crude section.

In one embodiment, the computer-readable medium further comprises displaying to an operator safe zones or safe boundaries for operating the overhead crude section.

Further, another aspect the invention comprises a method of using predictive analytics for control of an industrial asset. The method comprises monitoring a plurality of operating conditions of an industrial asset; determining chemistry conditions of the industrial asset at current operating conditions of the industrial asset; determining a plurality of fields of action by simulating a variation of one or more of the plurality of conditions; determining a risk indicator of asset performance for each of the plurality of fields of action; and providing a recommended change in operation and chemistry conditions of the industrial asset to one of the plurality of fields of action while adhering to one or more constraints.

In one embodiment of the method, the industrial asset comprises at least a portion of a refinery.

In one embodiment of the method, the portion of the refinery comprises an overhead crude section of the refinery.

In one embodiment of the method, the one or more constraints involve salting temperature, water dew point temperature and tower top temperature of the overhead crude section.

In one embodiment of the method, the salting temperature is constrained to be less than the water dew point temperature and the tower top temperature.

In one embodiment of the method, the overhead crude section comprises a distillation column and the plurality of operating conditions comprise one or more of the distillation column's operating conditions.

In one embodiment of the method, the distillation column's operating conditions comprise one or more of overhead condenser temperature, overhead condenser pressure, reflux flow and steam flow.

In one embodiment of the method, the plurality of operating conditions comprise one or more of industrial fluid properties or boot water properties of the overhead crude section.

In one embodiment of the method, the industrial fluids comprise one or more of a refinery fluid, a production fluid, cooling water, process water, drilling fluids, completion fluids, production fluids, crude oil, feed streams to desalting units, outflow from desalting units, refinery heat transfer fluids, gas scrubber fluids, refinery unit feed streams, refinery intermediate streams, finished product streams, and combinations thereof.

In one embodiment of the method, the one or more of industrial fluid properties or boot water properties of the overhead crude section comprise speciated amines, percent salt, chlorides, iron, and organic acids.

In one embodiment of the method, the amines are speciated using a multi-step ion-exchange chromatography method.

In one embodiment of the method, determining the plurality of fields of action by simulating a variation of one or more of the plurality of conditions comprises using a physics model and probability distribution models on one or more of the plurality of conditions and the determined hydrogen chloride and amine conditions.

In one embodiment of the method, the physics model and the probability distribution models on one or more of the plurality of conditions and the determined hydrogen chloride and amine conditions are simulated at levels of production that differ from a first level of production encountered at the current operating conditions of the overhead crude section.

In one embodiment of the method, determining a risk indicator of asset performance for each of the plurality of fields of action comprises performing a Monte Carlo simulation on the variation of one or more of the plurality of conditions as determined using the probability distribution models.

In one embodiment of the method, the crude overhead section is operated in accordance with the recommended change in operation of the overhead crude section.

In one embodiment, the method further comprises displaying to an operator safe zones or safe boundaries for operating the overhead crude section.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

DRAWINGS

The accompanying drawings, which are incorporated in and constitute a part of this specification, illustrate embodiments and together with the description, serve to explain the principles of the methods and systems:

Figure 5A:
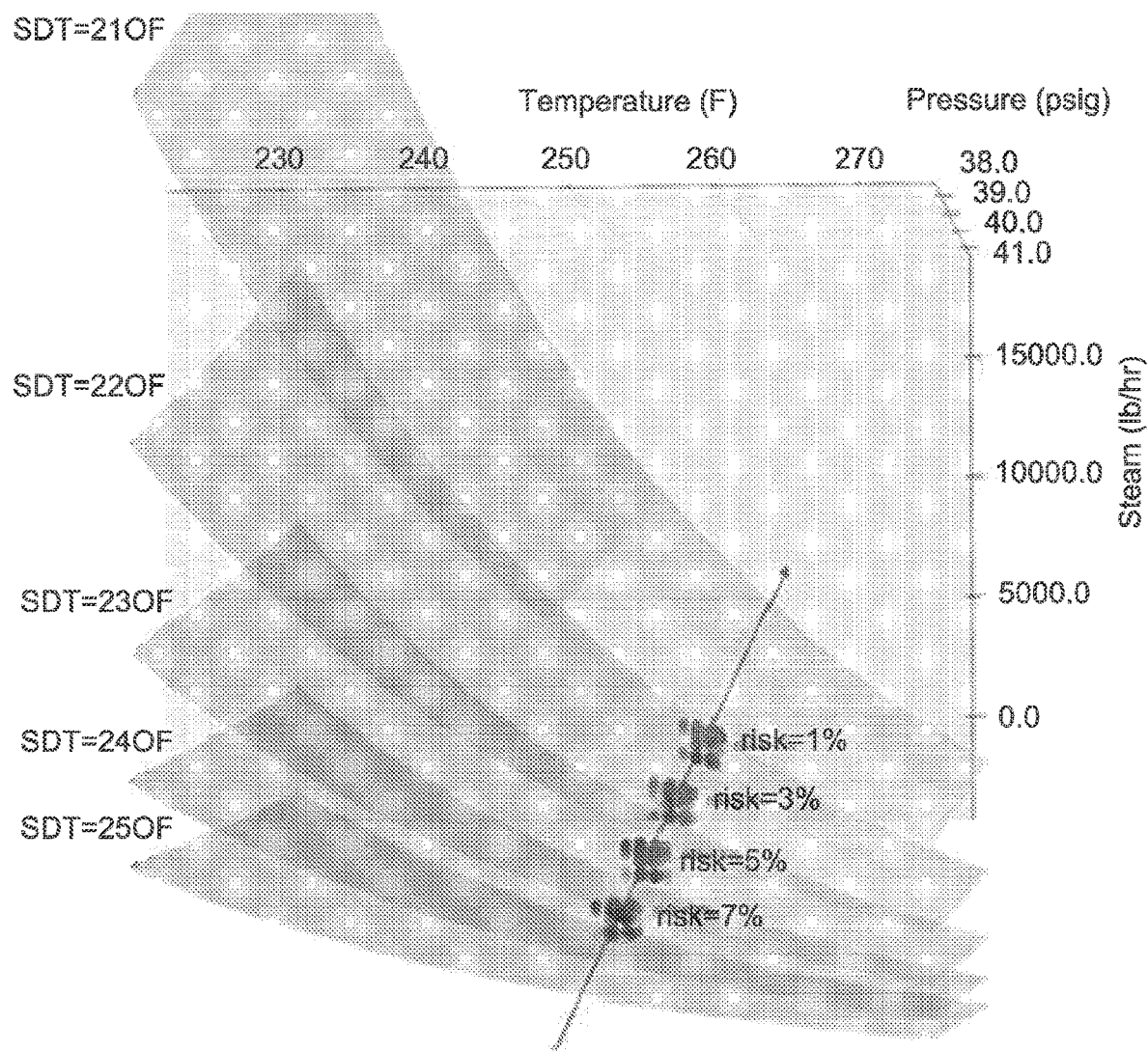
FIG. 5A illustrates percent salting risk Monte Carlo simulation results overlayed on the fields of action (FIGS.
Figure 5C:
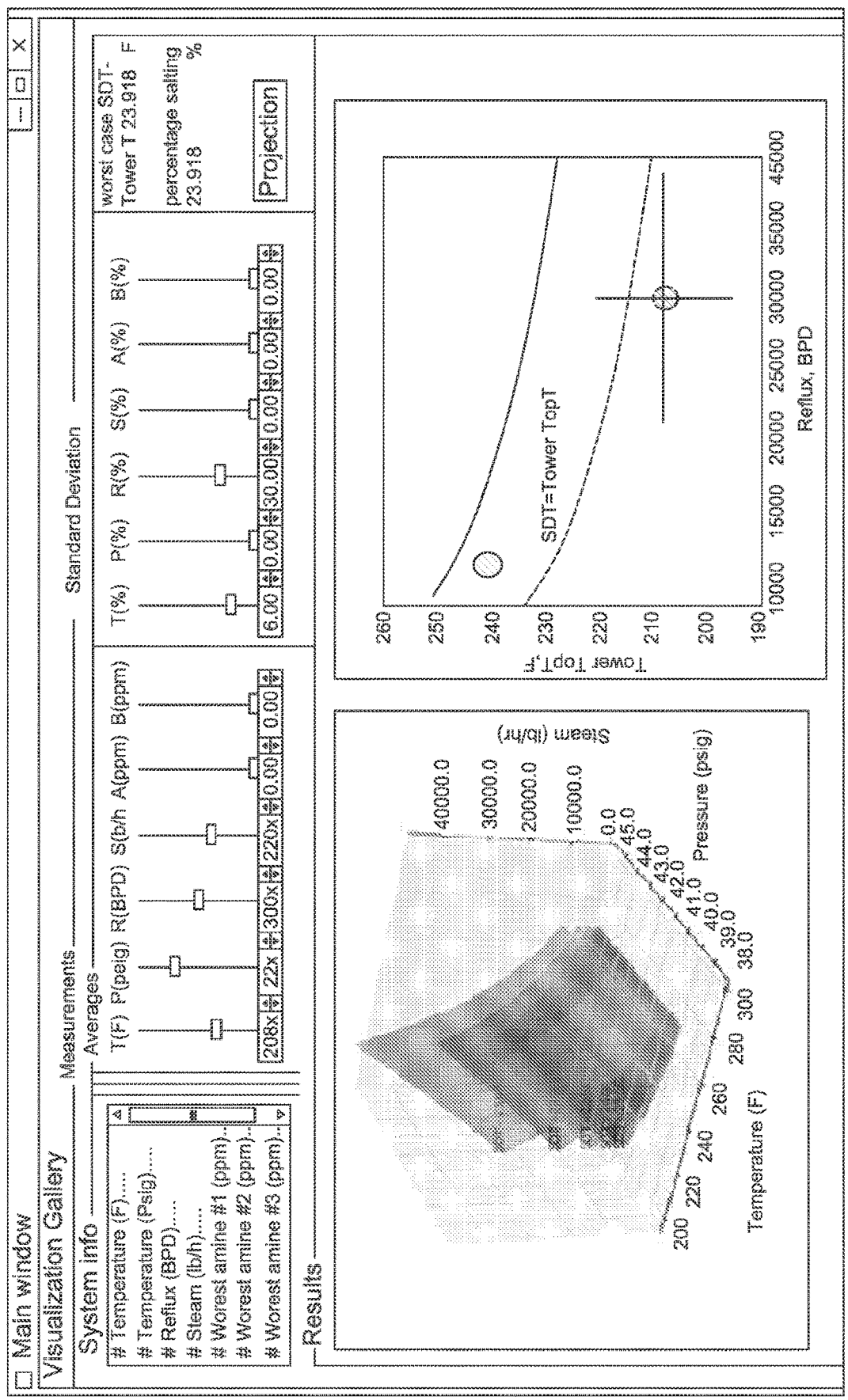
Figure 5D:
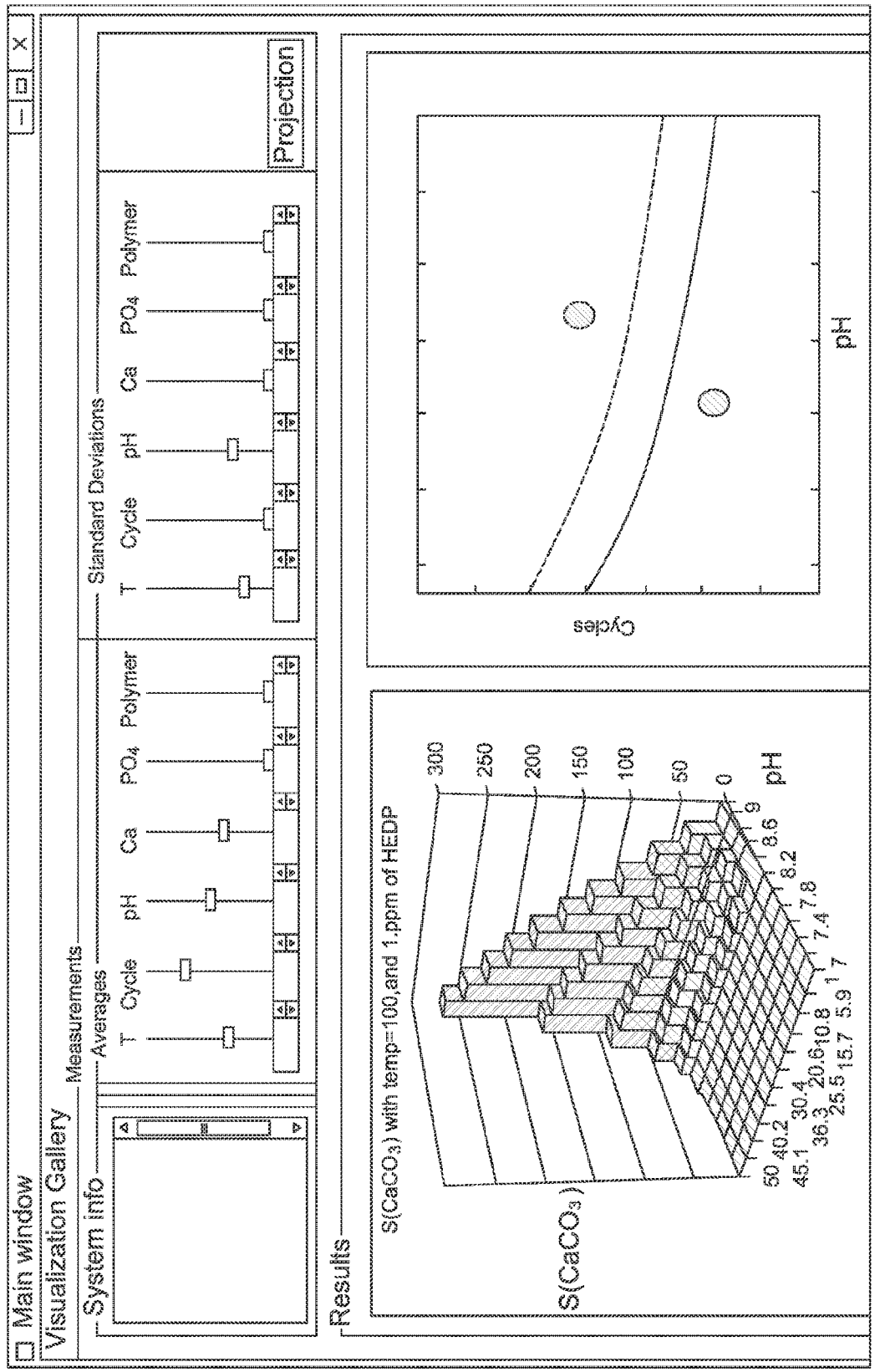
Figure 5E:
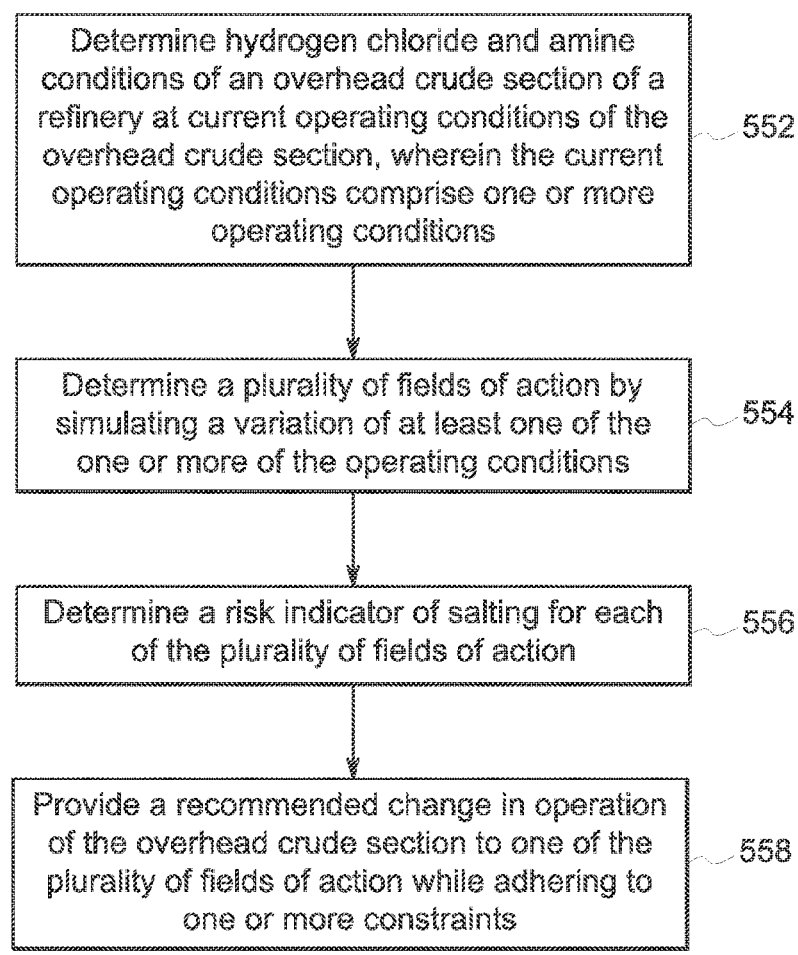
Figure 6:
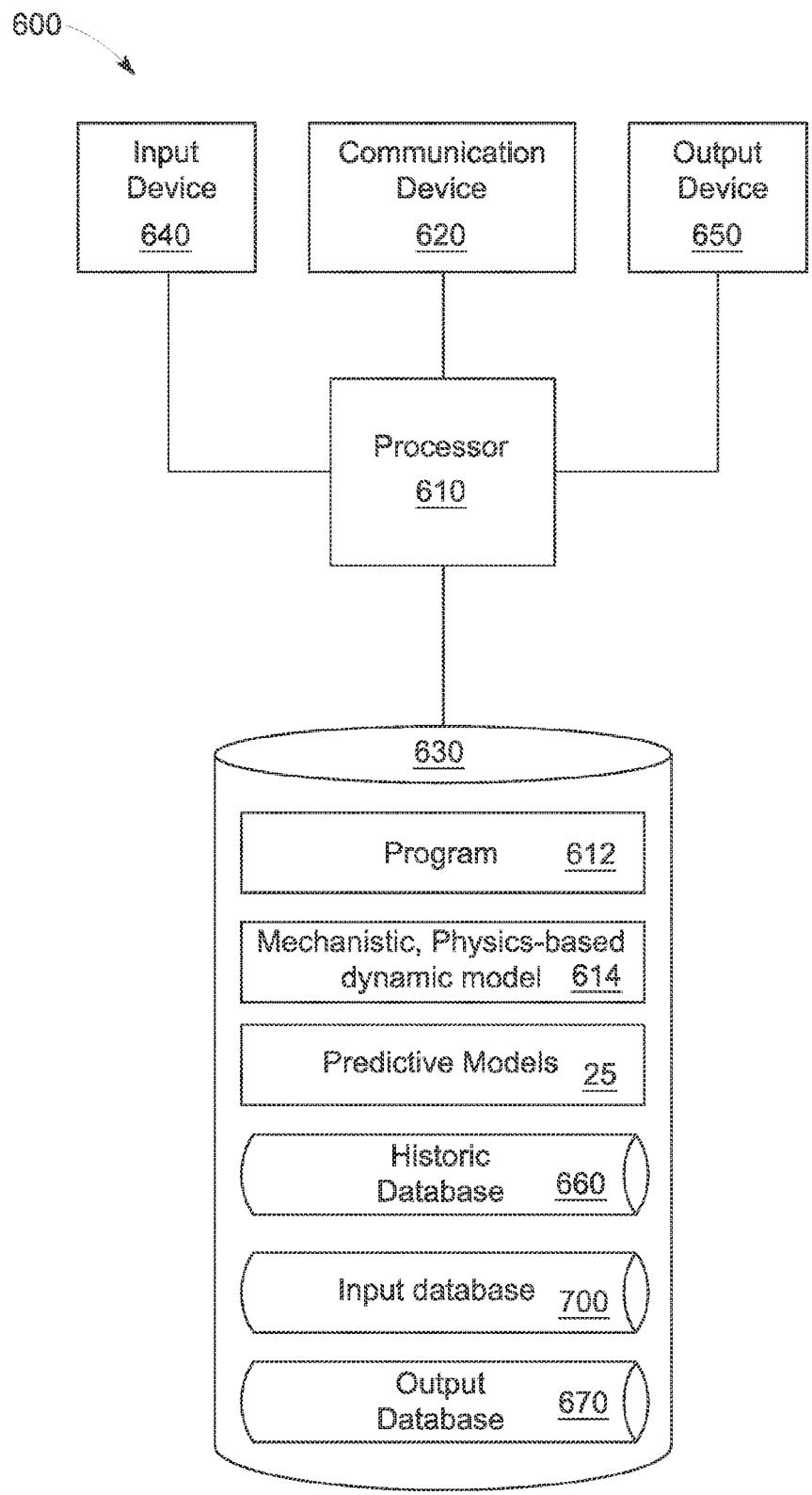

3A and 3B) to determine optimum an direction/recommendation to maximize plant corrosion protection as well as maximize plant production;

FIG. 5B is a graphical representation of exemplary recommended changes in operation of the overhead crude section;

FIGS. 5C and 5D illustrate screen shots of safe zones and safe boundaries visualizations for operating an overhead crude section that can be displayed to an operator;

FIG. 5E is a flowchart illustrating a method of using predictive analytics for control of an overhead crude section of a hydrocarbon refining process; and FIG. 6 is block diagram of a platform according to some embodiments of the present invention.

DETAILED DESCRIPTION

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes¬ from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

Figure 1:
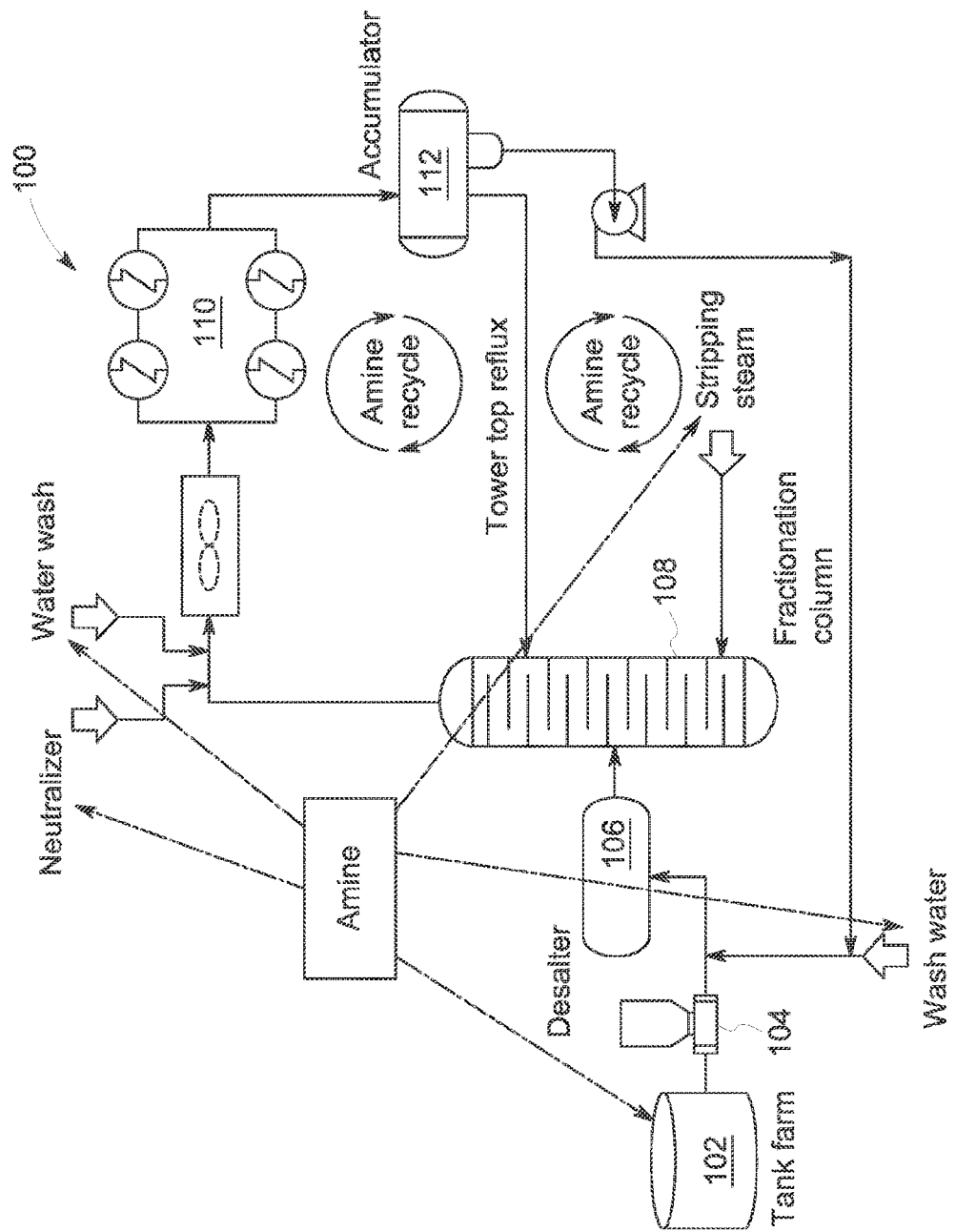
FIG. 1 is a simplified overview diagram of a hydrocarbon refining process.

FIG. 1 is a simplified overview diagram of a hydrocarbon refining process 100. For examples, the process 100 shown in FIG. 1 can comprise a multi-stage crude oil refinement process. The hydrocarbon refining process 100 can include, for example, a tank farm 102, a cold preheat train 104, a desalter 106, a fractionation (or distillation) column 108, coolers 110, and an accumulator 112. FIG. 1 further illustrates amines within the refining process including neutralizing amines that are intentionally added to control overhead pH conditions and tramp amines, as described herein. Amines and chlorides in the refining processing can result in corrosion based on salting in the components that comprise the refinery under certain operating conditions. In particular, operation of the overhead crude section (that section of the refining process from the distillation column to the accumulator) under certain operating conditions can result in higher likelihood of salting than under other conditions.

Figure 2:
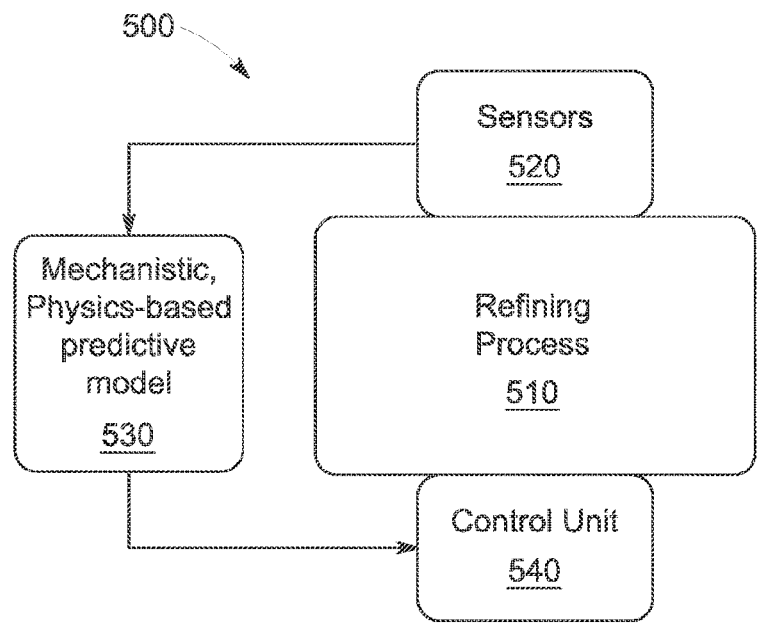
FIG. 2 is a block diagram of a control system in accordance with some embodiments.

The components of the process 100 shown in FIG. 1 can be in communication with a control system (not shown FIG. 1). The control system can monitor and/or control various aspects of the process 100. FIG. 2 is a block diagram of a control system 500 in accordance with some embodiments. The system 500 includes a refining process 510 monitored by one or more sensors 520. Data from the sensors 520 is fed to a mechanistic, physics-based predictive model 530 that analyzes the data and can provide an output to a control unit 540 to improve operation of the refining process 510 in substantially real time. In particular, the predictive model can comprise a method of using predictive analytics for control of an overhead crude section of a hydrocarbon refining process comprising monitoring one or more operating conditions of an overhead crude section of the refining process 510; determining one or both of hydrogen chloride and amine conditions of the overhead crude section of the refinery at current operating conditions of the overhead crude section; determining a plurality of fields of action by simulating a variation of at least one of the one or more operating conditions; determining a risk indicator of salting for each of the plurality of fields of action; and providing a recommended change in operation of the overhead crude section to one of the plurality of fields of action while adhering to one or more constraints. The control unit 540 can be used to implement the recommended changes in operation of the overhead crude section. As used herein, the first level of production refers to the state of the refining process as it is initially found, prior to employing a method of using predictive analytics for control of an overhead crude section of a hydrocarbon refining process. Operating conditions comprises the various temperatures, pressures, flow rates and other variables of production such as, for example, overhead condenser temperature, overhead condenser pressure, reflux flow, steam flow, and the like. The first level of production is the amount of product that is being produced by the refining process at its initial state—before recommended changes in operation of the overhead crude section are implemented. In one aspect, the process may be constrained to at least maintain the first level of production during and after the recommended changes in operation of the overhead crude section are implemented.

While some values of operation of the refining process 510 can be captured in real-time using the sensors 520, others can be modeled using first principle physics models to capture plant operation and chemistry, and, at geometric center of real data, calculate gradients for salt point temperature and total overhead naphtha (OHD) product flow. Measured and/or modeled values can include one or more of the distillation column's operating conditions such as overhead condenser temperature, overhead condenser pressure, reflux flow, steam flow, and hydrogen chloride and amine conditions of the overhead crude section of the refinery at current operating conditions of the overhead crude section. The plurality of operating conditions comprise one or more of industrial fluid properties or boot water (as determined from the accumulator 112) properties of the overhead crude section. The industrial fluids can comprise one or more of a refinery fluid, a production fluid, cooling water, process water, drilling fluids, completion fluids, production fluids, crude oil, feed streams to desalting units, outflow from desalting units, refinery heat transfer fluids, gas scrubber fluids, refinery unit feed streams, refinery intermediate streams, finished product streams, and combinations thereof. The one or more of industrial fluid properties or boot water properties of the overhead crude section can comprise speciated amines, percent salt, chlorides, iron, organic acids, etc. The amines can be speciated using a multi-step ion-exchange chromatography method such as that described in U.S. Provisional Patent Application Ser. No. 62/191,576, filed on Jul. 13, 2015, which is fully incorporated herein by reference, and made a part hereof.

Figure 3A:
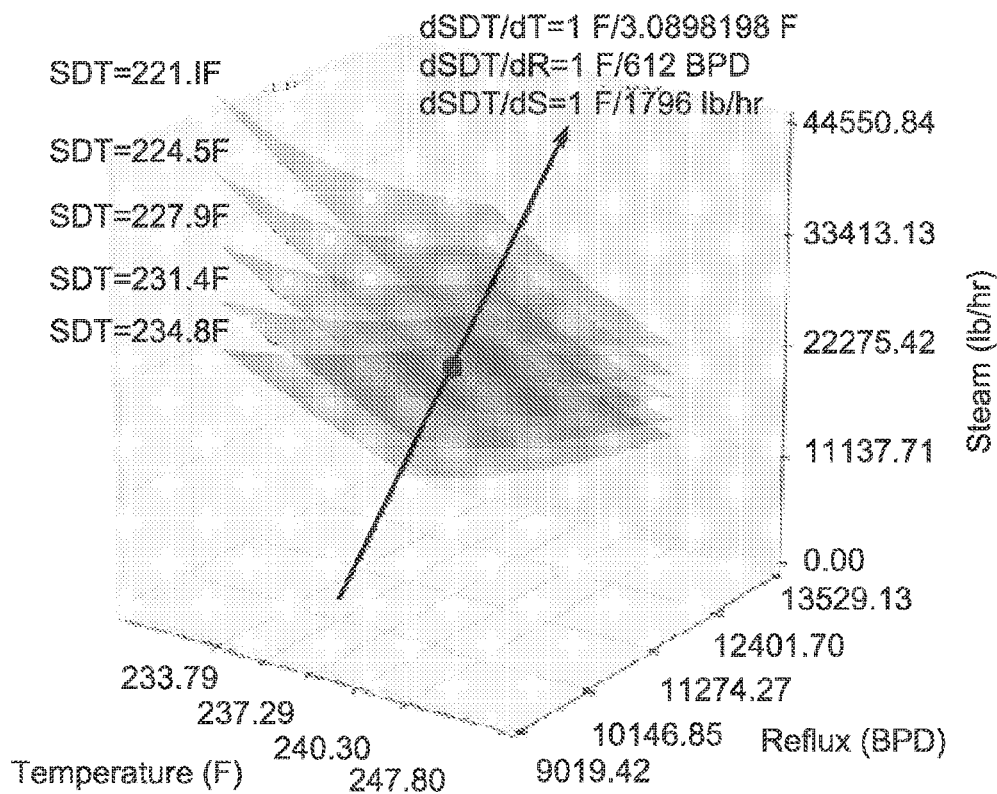
FIG. 3A illustrates fields of action for an overhead crude section operating in max gas mode.
Figure 3B:
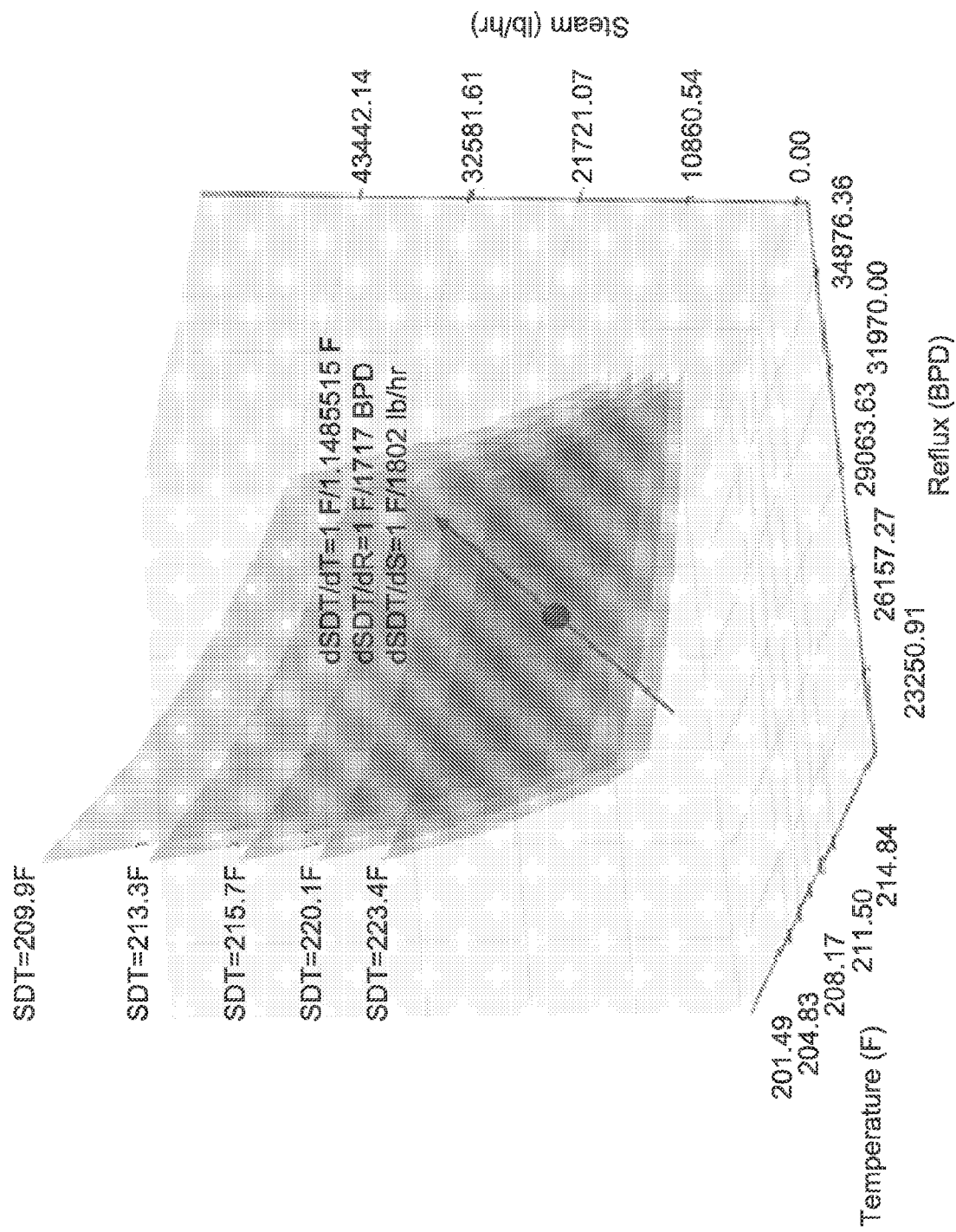
FIG. 3B illustrates fields of action for an overhead crude section operating in max diesel mode.

From the measured and/or monitored values, gradients for salt point temperature and total OHD product flow can be calculated, which define fields of action of the refining process 510, and in particular the overhead crude section of the refining process 510. For example, FIG. 3A illustrates fields of action for an overhead crude section operating in max gas mode, where a 3 degrees Fahrenheit Temperature (T) increase=a 1 degree Fahrenheit salt deposition temperature (SDT) drop, and a 612 barrels per day (BPD) reflux (R) increase=1 degree Fahrenheit SDT drop. Similarly, FIG. 3B illustrates fields of action for an overhead crude section operating in max diesel mode, where a 1 degree Fahrenheit T increase=1 degree Fahrenheit SDT drop, and a 1717BPD R increase=1 degree Fahrenheit SDT drop. In both FIGS. 3A and 3B, the dot indicates the average operating position of the refinery process 510 (for a selected product) and the vector indicates where the plant can move, operationally. Therefore, the operation of the refinery process 510 can be represented as a scalar field. This can be comprised of a general modeling methodology of separating data into averages and variations, using averages to construct scalar fields of production, asset protection and economics, and gradients and constraints, and separating sources of variations, modeling as stochastic variables and performing integration to consolidate effect of variation into intuitive measures. This facilitates industry plant asset monitoring that may require a measurement system, which can consolidate big data into various functional forms/fields, such that prediction and action within the fields can be calculated.

Figure 4A:
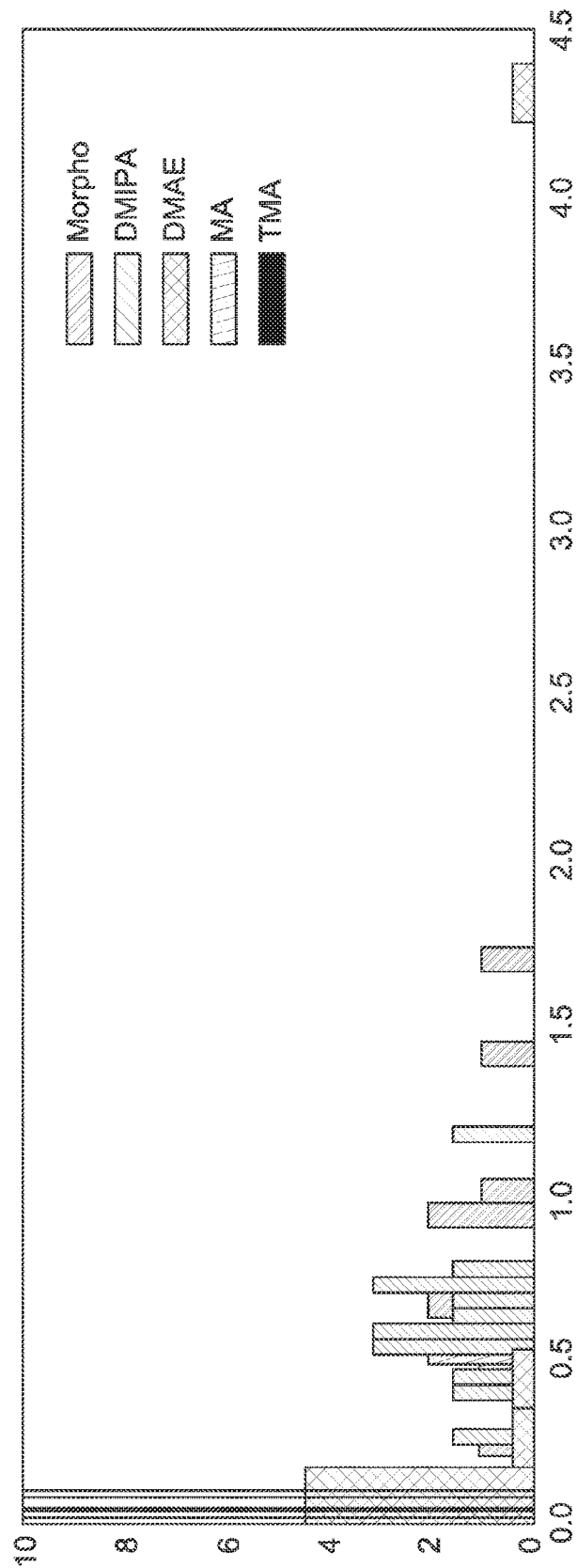
FIGS. 4A and 4B illustrate amine mass flows in the refining process modeled as lognormal distributions.
Figure 4B:
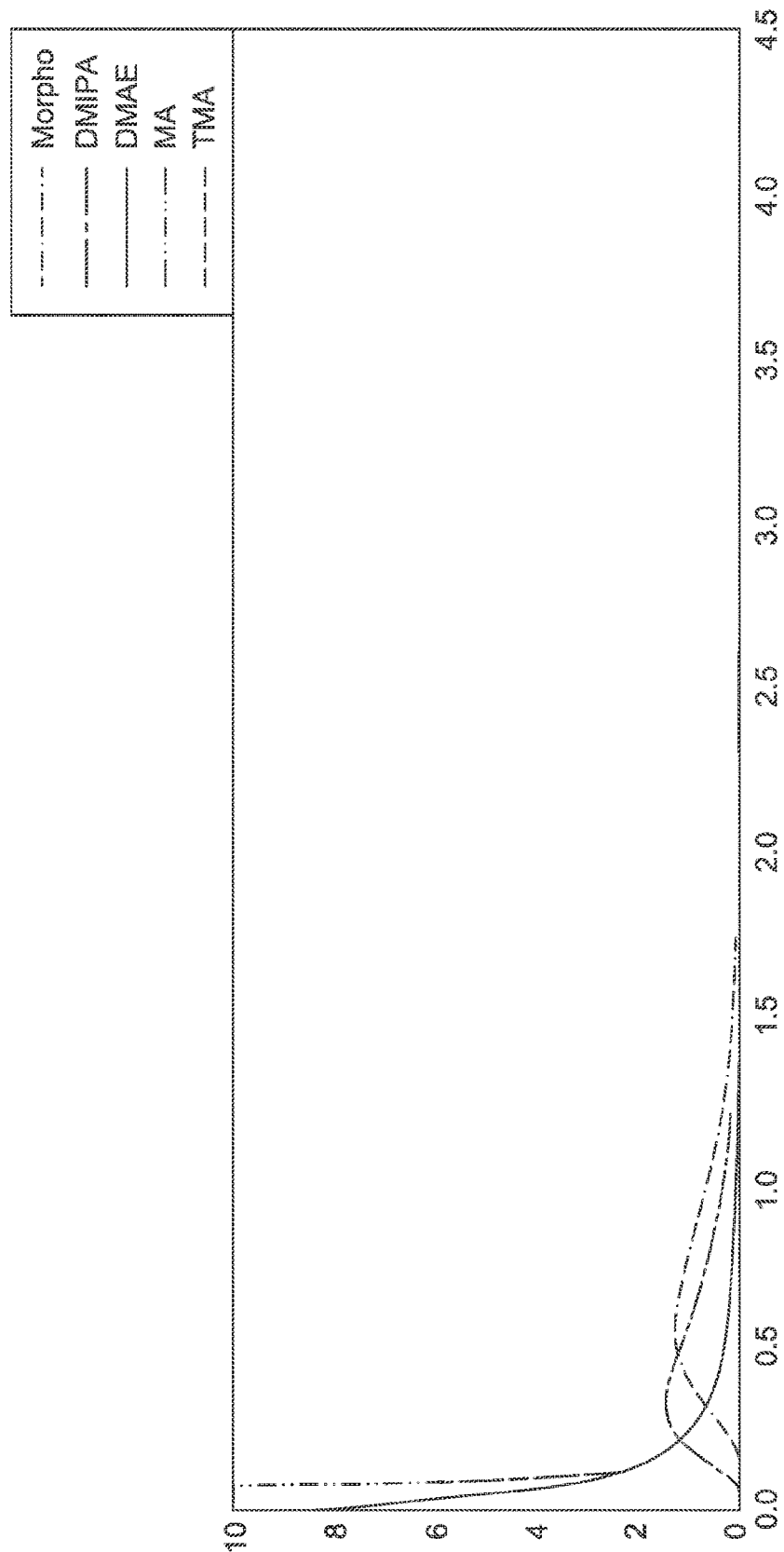
Figure 4C:
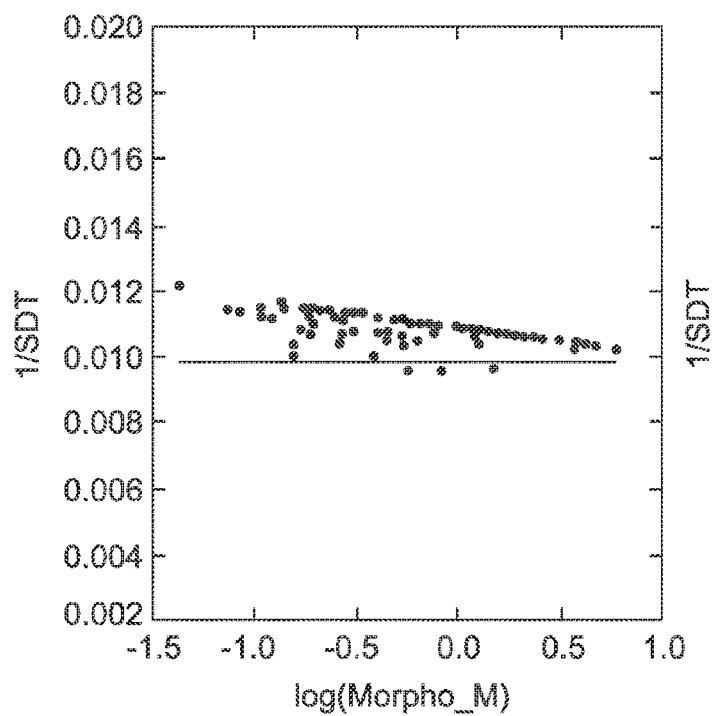
FIGS. 4C-4G illustrate percent salting risk for different amines determined by Monte Carlo simulation based on the thermodynamic model that combines both variations from plant operation and amine chemistry.
Figure 4D:
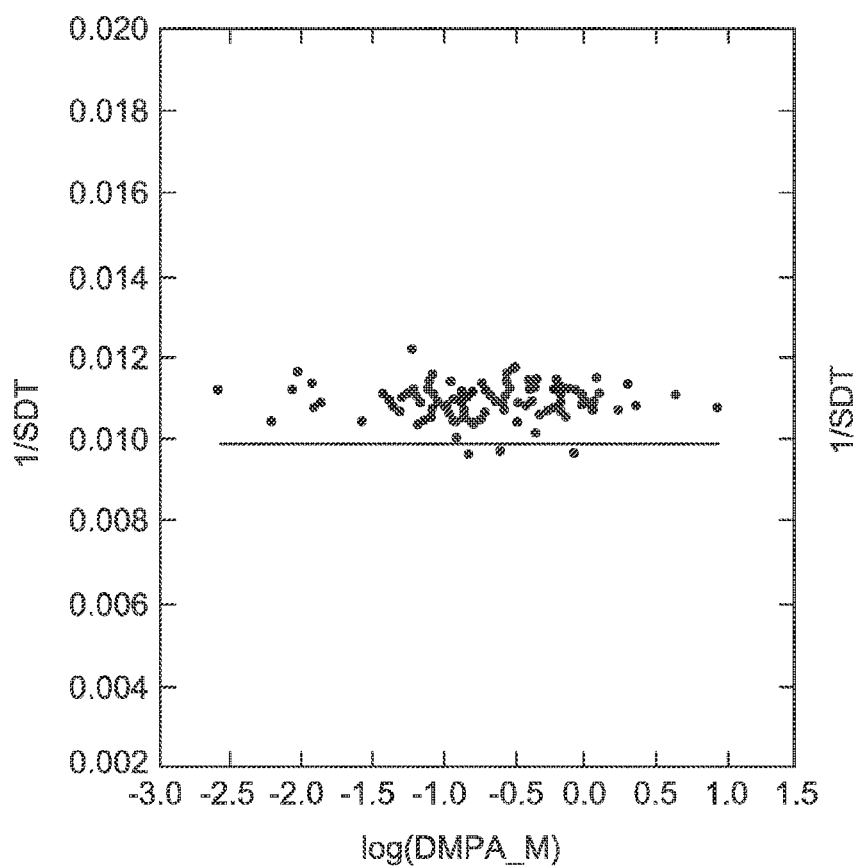
Figure 4E:
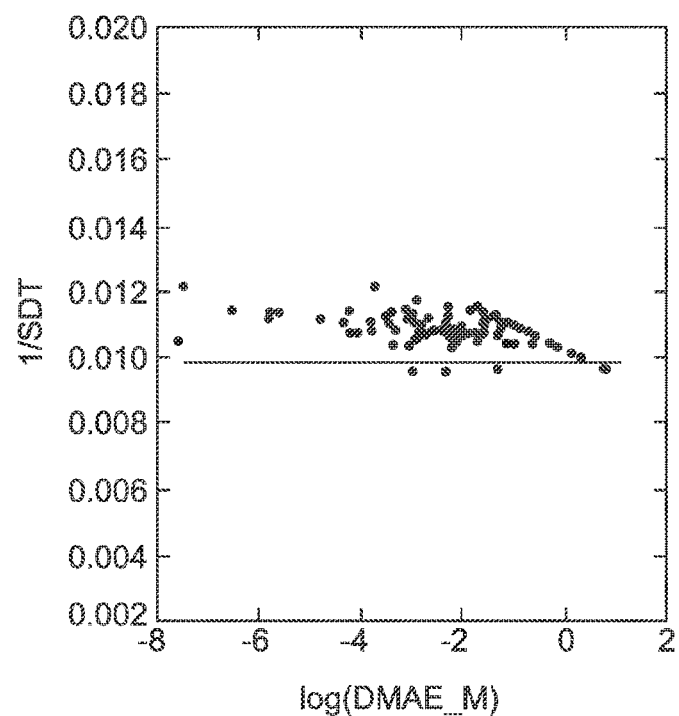
Figure 4F:
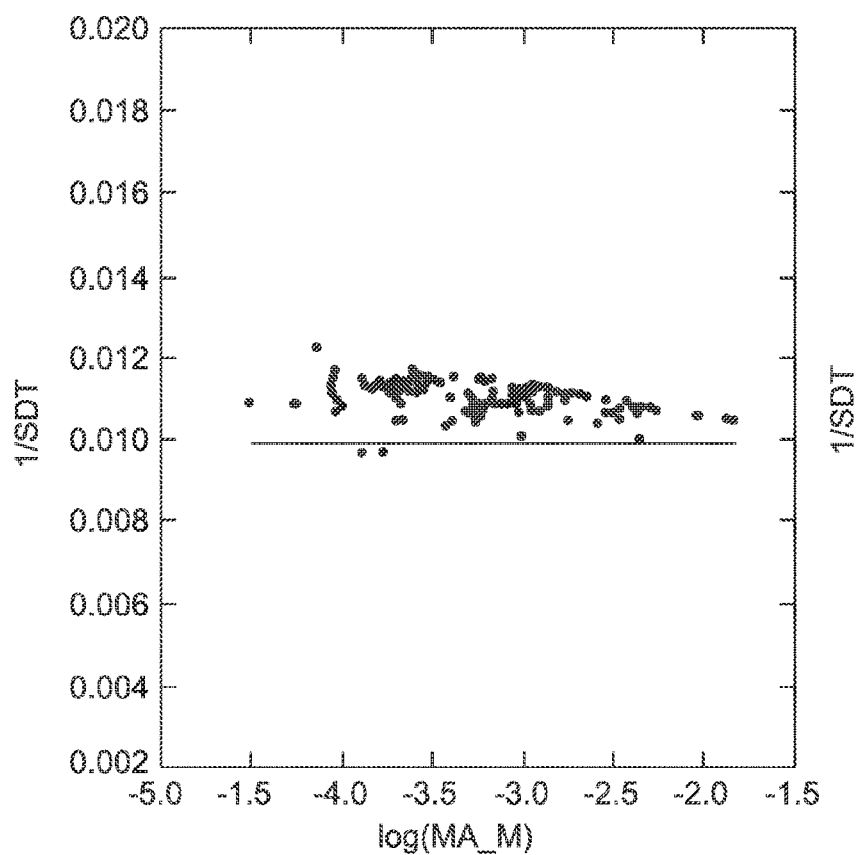
Figure 4G:
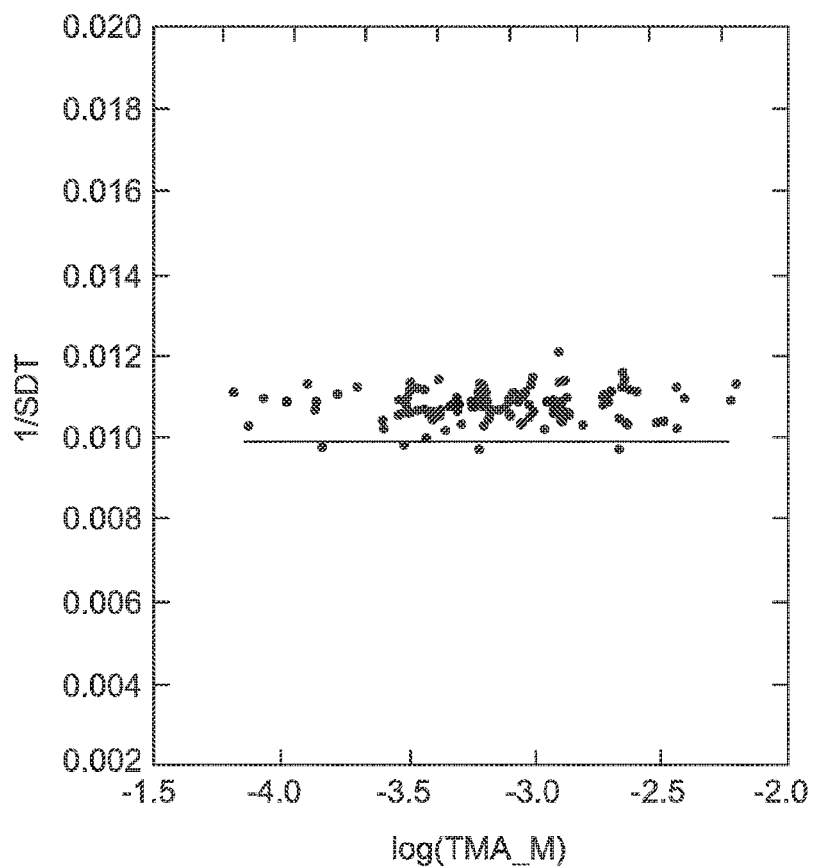

Probability distribution models can be used to capture plant real data variation. For example, as shown in FIGS. 4A and 4B, amine mass flows in the refining process 510 can be modeled as lognormal distributions where the x axis represents mass flows for amine species, and the y axis represents frequency (FIG. 4A) and probability (FIG. 4B), respectively. Different colors, or cross-hatching, are assigned to different amine species. Further, as shown in FIGS. 4C-4G, Monte Carlo simulation based on the thermodynamic model is used to combine both variations from plant operation and amine chemistry to calculate percent salting risk (i.e. corrosion risk) at the current conditions of the refining process 510, where the x axis represents logarithm of amine species mass flow, y axis represents 1/SDT. The result shows dimethylaminoethanol (DMAE) or dimethyl ethanol amine (DMEA) (FIG. 4E) is the worst amine, which has dominant effect on Salt Deposition Temperature (SDT).

The percent salting risk Monte Carlo simulation results can be overlayed on the fields of action (see FIGS. 3A and 3B) to determine an optimum direction/recommendation to maximize plant corrosion protection as well as maximize plant production, as shown in FIG. 5A. In FIG. 5A, the clusters of dots on each iso-plane indicate a separate Monte Carlo simulation result for the refining process 510. From this representation, risks of salting at different fields of action (iso-planes) can be graphically represented, as well as the effect on changing various combinations of operation parameters of the refining process. Crude overhead section chemistry variation can be captured as stochastic distributions, while production field, asset protection field and economic field can be visualized based on geometric center of plant operation and chemistry, the variation is visualized as dot clusters with their densities representing statistical salting risk. Because plant operation and amine chemistry are subject to variations, salting risk can only be conveyed in a statistical way; therefore, dot clusters generated from Monte Carlo simulation and their dot density color code or other visual representation can be used to visualize statistical salting. As shown in FIG. 5A, for an industrial plant, production, asset protection of production equipment and economics of maximizing production as well asset protection are inter-related. These aspects can be shown as scalar fields in plant operation space, depicting the sensitivities of these aspects to plant operation so that an optimal path can be identified to improve plant operation. Plant variations are also taken into account such that plant operation movement is visualized as clusters of dots that can be color coded or use other visyual representations to convey statistical asset risks.

The recommended changes to operation of the overhead crude section can be made while adhering to one or more constraints, such as production level, amount of amines and chlorides, and the like. For example, the constraints can involve salting temperature, water dew point temperature, and tower top temperature of the overhead crude section. (e.g., the salting point temperature should be at least 15F lower than dew point temperature and lower than the tower top temperature Constraints can be associated with plant operation and asset protection. For example, salting point temperature should be at least 25F lower than tower top temperature. Further, providing a recommended change in operation or chemistry of the overhead crude section to one of the plurality of fields of action while adhering to one or more constraints may comprise providing a recommended change in one or both of HCl and amine conditions of the overhead crude section. Because it is the product of the partial pressures of HCl and amine that drive salting behavior, changes in either species can be used to affect salting behavior. In some cases, operation of the overhead crude section may be constrained to only be able to reduce one, or the other. Examples of chloride control include good desalting practices, use of caustic, and the like. For amines, point source control, engineering modifications, neutralizer injection and the like may be used for control.

Providing a recommended change in chemistry in the overhead may comprise providing information on how to change the operating conditions of the refinery (including the desalter, overhead, etc.) and/or by providing information which can be used to determine which chemical treatment to use in the overhead. Potential sources of corrosion in the overhead include acid (such as HCl) or salts derived from amines present in the system or neutralizer amines added to address HCl issues. Tramp amines are amines which are recirculated in the system and can cause salting, and sources of tramp amines can be the hydrocarbon itself or neutralizers added to address acidity in the overhead. The neutralizers can be added directly to the overhead to address this HCl issues in the condensing system. Hydrolysis inhibitors, which can result in, for example, magnesium chloride and calcium chloride being converted to sodium chloride, can be used before the desalter, or at the desalter, or after the desalter before the fractionation column to reduce overhead HCl issues. This is advantageous since, for example, sodium chloride has a much lower hydrolysis rate than magnesium chloride or calcium chloride, which reduces corrosion. The crude can be treated with a hydrogen sulfide ($H_2S$) scavenger to remove some chlorides (which reduces HCl). Since the source of tramp amines can be the hydrocarbon itself or the neutralizers used to reduce HCl, it is important to choose neutralizer amines carefully to avoid exacerbating a tramp amine problem so the use of low-salting potential neutralizers is one option. The $H_2S$ scavengers can be non-amine (to reduce salt potential), or low-salting potential amine $H_2S$ scavengers. It is also possible to add acid to the desalter to reduce the amines present in the system. Another option is to advise a refiner to purchase crudes (or crude blends) treated with a non-amine $H_2S$ scavenger or an $H_2S$ scavenger with low-salting potential.

Potential hydrolysis inhibitors include caustic soda or caustic potash or organic hydroxides (no metals). Potential neutralizers, if they are amines, are preferably low salting amines which have a salt PPI of less than cyclohexylamine. Examples of amines that can be used and their salting index are shown below in Table I. The Salt PPI (amine-HCl salt precipitation potential index) may also be known by those in the art as the salt volatility index. These indices are merely a comparison of the precipitation potential of the amine salt to the salt of a typical neutralizing compound used in hydrocarbon refining, ammonia. Salt PPI may be calculated from the equation:

$$\frac{\left[\frac{p_{225°F.}(NH_4Cl)}{p_{225°F.}(Amine \cdot HCl)}\right] + \left[\frac{p_{300°F.}(NH_4Cl)}{p_{300°F.}(Amine \cdot HCl)}\right]}{2}$$

where p is the vapor pressure at either 225 or 300° F. U.S. Pre-Grant Publication US20150114884, filed Oct. 31, 2013 and published Apr. 30, 2015, which is fully incorporated by reference, further explains the salting potential calculations.

TABLE I

| Amine | PPI |
| --- | --- |
| Diethylhydroxylamine | <0.1 |
| Ethyhexylamine | <0.1 |
| N-methyldibutylamine | <0.1 |
| N-methyldipropylamine | <0.1 |
| N-methylpyrrolidine | <0.1 |
| N-methylpyrrolidine | 0.1 |
| Trimethylamine | 0.1 |
| Diethylpropargylamine | 0.12 |
| Trimethyl amine (TMA) | 0.2 |
| di-N-propyl amine | 0.24 |
| N-methyl piperidine | 0.24 |
| N-MethylMorpholine | 0.25 |
| 2-Dimethylamino 2-methyl 2-propanol | 0.27 |
| Dimethyl propyl amine | 0.3 |
| Furfurylamine | 0.38 |

TABLE I-continued

| Amine | PPI |
| --- | --- |
| Dimethyl Propyl Amine (DMPA) | 0.4 |
| Dimethylamino 2-methyl 1-proponal (DMAMP) | 0.4 |
| N,N,N-tetramethylethylenediamine | 0.48 |
| 2-METHOXYISOPROPYLAMINE (MOIPA) | 0.8 |
| Dimethylaminopropylamine (DMAPA) | 0.8 |
| Dimethylcyclohexylamine (DMCYHXA) | 0.8 |
| Dimethylisoproponalamine (DMIPA) | 0.8 |
| Sec-butyl amine (SBA) | 0.8 |
| Diethylhydroxylamine (DEHA) | 0.85 |
| Ammonia | 1 |
| Dimethylamine (DMA) | 1.1 |
| Morpholine | 1.2 |
| Dimethylaminoethanol(DMAE) | 1.4 |
| Diethylethanolamine (DEAE) | 1.5 |
| Methoxypropylamine (MOPA) | 2.3 |
| Di Butyl amine (DBA) | 2.4 |
| Methylamine (MA) | 2.8 |
| monoisopropanolamine (MIPA) | 4.4 |

Filmers can also be added in the refining process to address corrosion by both HCl and by amine salts since they form a barrier to protect the overhead metal from corrosion. Potential filmers include: Fatty acids; dimer/trimer of fatty acids; Fatty diacids; Fatty amines; Fatty amine ethoxylates; Fatty diamines; Fatty amine/ammonium quats; Fatty amine/ammonium diquats; Fatty imidazolines; Fatty amido amines; Fatty pyrimidinium salts; reaction products of fatty anhydride and polyamines; reaction products of fatty anhydride, alcohol and ammonia/amine/polyamines; reaction products of alkyne diol and polyamine.

FIG. 5B is a graphical representation of recommended changes in operation of the overhead crude section. As illustrated in FIG. 5B, the (thick) dotted line 502 SDT=TowerTopT represents the boundary line where Salt Deposition Temperature (SDT) is equal to Tower Top Temperature (TowerTopT), above which SDT<TowerTopT, whereas below which SDT>TowerTop T. Similarly, the (thick) dotted line 504 SDT=DPT represents the boundary line where Salt Deposition Temperature (SDT) is equal to Dew Point Temperature (DPT), above which SDT<DPT, whereas below which SDT>DPT. The plant operates at two distinctive operation points, one is the dot 506, representing the maxGas mode, and the other is the dot 508, representing the maxDiesel mode. The maxDiesel mode SDT is larger than both DPT and TowerTopT, salting is happening both at the overhead condenser and column top. There are two options: one is the arrow pointing to the upper left, i.e. increase TowerTopT and decrease Reflux (compromising diesel production) in exchange of safer operation (i.e. reduce production rate in exchange of longer production time); the other one is the arrow pointing to the right, i.e. increase the diameter of the pipe to increase both TowerTopT and Reflux in a way diesel production is maintained, (i.e. modify design, maintain production rate and achieve longer production time in exchange of capital investment). The refining process 510, in particular the overhead crude section, can then be operated in accordance with the recommended change in operation of the overhead crude section. As shown in FIG. 5B, recommended operation of the overhead crude section is based on manipulation of distillation curves and offers a way to quantify various plant operations (including tower top Temp, pressure, stripping steam and reflux) and their impacts on plant production. Because of that, asset protection risk (Y) can be linked to plant production (X) such that a holistic optimization and control approach can be taken toward operation of the crude overhead section, which maximizes production (X) while minimizes asset protection risk (Y).

The plant owner/operator can therefore make decisions in the forms of recommendations for safe operation of the plant, or insurance/warrantee policies. For an industry plant asset, after analytics transforms data into a functional form based on both physics modeling and stochastic modeling, it can provide control trajectories and surfaces to better guide plant to move to optimum operation.

As can be seen in FIG. 5B, temperature and reflux are generally the two operation factors which have the most impacts on production. Their impacts can be demonstrated by using the distillation curve. For example, increase of temperature moves up along the curve (thus more heavy end with higher boiling temp), increase of reflux moves down the heavy end of the curve (thus less heavy end with higher boiling temp), all plant operation variables move distillation curves to satisfy tower pressure equal to calculated pressure, by maintaining constant distillation curve, correlation among all operation variables and sensitivity of one to another can be quantified, and increase of steam moves up along distillation curve due to lifting effect (thus more heavy end with higher boiling temp)

As shown in FIGS. 3A-5B, the overhead crude section can be visualized in multi-dimensional space of temperature, pressure, steam, and reflux. Within the multi-dimensional space, the production field can be visualized as iso-total product surfaces with gradients and constraint, the asset protection field can be visualized as iso-SDT surfaces with gradients and constraints, and the economic field can be visualized as iso-economic penalty surfaces with gradients and constraints. Graphic representations such as these can be provided to an operator using a graphical user interface to assist in making decisions about the operation of the overhead crude section.

For example, as shown in FIGS. 5C and 5D, safe zones and safe boundaries for operating an overhead crude section can be visually displayed to an operator. Constraints, such as requiring the overhead section operate at a temperature less than tower top temperature, and the like, can be used to define a safe zone boundary. Averages of factors such as a plurality of operating conditions and hydrogen and amine conditions of an overhead crude section of a refinery at a first level of product can extend or shrink the safe zone and variations of the factors can widen or shrink uncertainties around safe zone boundaries (which form a band). These visualization methodologies can be applied to salting in the overhead condenser as well as to a cooling water supersaturation safe zone as well.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described herein with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks. For example, the flowchart of FIG. 5E illustrates a method of using predictive analytics for control of an overhead crude section of a hydrocarbon refining process.

In one aspect, the method can comprise monitoring one or more operating conditions of an overhead crude section of a refinery. The overhead crude section can comprise a distillation column and the one or more operating conditions can comprise one or more of the distillation column's operating conditions. The distillation column's operating conditions can comprise one or more of overhead condenser temperature, overhead condenser pressure, reflux flow and steam flow. The one or more operating conditions may also comprise one or more of industrial fluid properties or boot water properties of the overhead crude section. The industrial fluids can comprise one or more of a refinery fluid, a production fluid, cooling water, process water, drilling fluids, completion fluids, production fluids, crude oil, feed streams to desalting units, outflow from desalting units, refinery heat transfer fluids, gas scrubber fluids, refinery unit feed streams, refinery intermediate streams, finished product streams, and combinations thereof. The one or more of industrial fluid properties or boot water properties of the overhead crude section comprise speciated amines, percent salt, chlorides, iron, organic acids, etc. The amines can be speciated using a multi-step ion-exchange chromatography method.

At 552, hydrogen chloride and amine conditions of the overhead crude section of the refinery at current operating conditions of the overhead crude section are determined at a current state of production (i.e., at a first level of production), wherein the current operating conditions comprise one or more operating conditions.

At 554, a plurality of fields of action are determined by simulating a variation of at least one of the one or more operating conditions. Determining the plurality of fields of action by simulating a variation of the at least one of the one or more operating conditions can comprise using probability distribution models and/or physics models on at least one of the one or more operating conditions and the determined hydrogen chloride and amine conditions. The probability distribution models used on the at least one of the one or more operating conditions and the determined hydrogen chloride and amine conditions can be simulated at levels of production that differ from a first level of production encountered at the current operating conditions of the overhead crude section.

At 556, a risk indicator of salting for each of the plurality of fields of action is determined. Determining the risk indicator of salting for each of the plurality of fields of action can comprise performing a Monte Carlo simulation on the variation of at least one of the one or more operating conditions as determined using the probability distribution models and/or physics models.

At 558, a recommended change in operation of the overhead crude section to one of the plurality of fields of action while adhering to one or more constraints is provided. The one or more constraints can involve salting temperature, water dew point temperature, and tower top temperature of the overhead crude section. For example, the salting temperature is constrained to be less than the water dew point temperature and the tower top temperature. The crude overhead section can be operated in accordance with the recommended change in operation of the overhead crude section.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The embodiments described herein may be implemented using any number of different hardware configurations. For example, FIG. 6 illustrates a platform 600 that may be, for example, associated with the system and method of FIGS. 1-5E. The platform 600 comprises a processor 610, such as one or more commercially available Central Processing Units (CPUs) in the form of one-chip microprocessors, coupled to a communication device 620 configured to communicate via a communication network (not shown in FIG. 6). The communication device 620 may be used to communicate, for example, with one or more remote requestor devices, weather reporting services, an analyzer, and the like. The platform 600 may further include an input device 640 (e.g., a mouse and/or keyboard to enter information about model algorithms) and an output device 650 (e.g., to output reports regarding desalting operations, operation of the refining process, and the like).

The processor 610 also communicates with a storage device 630. The storage device 630 may comprise any appropriate information storage device, including combinations of magnetic storage devices (e.g., a hard disk drive), optical storage devices, mobile telephones, and/or semiconductor memory devices. The storage device 630 stores a program 612 and/or a model or application 614 and/or predictive models 25 for controlling the processor 610. The processor 610 performs instructions of the programs 612, 614, 25 and thereby operates in accordance with any of the embodiments described herein. For example, the processor 610 may receive data associated with operating conditions of an overhead crude section of the refining process. The processor 610 may be used to determine one or both of hydrogen chloride and amine conditions of the overhead crude section of the refinery at current operating conditions of the overhead crude section. The processor 610 may be used to determine a plurality of fields of action by simulating a variation of one or more of the plurality of conditions, determine a risk indicator of salting for each of the plurality of fields of action, and provide a recommended change in operation of the overhead crude section to one of the plurality of fields of action while adhering to one or more constraints.

The programs 612, 614, 25 may be stored in a compressed, uncompiled and/or encrypted format. The programs 612, 614, 25 may furthermore include other program elements, such as an operating system, a database management system, and/or device drivers used by the processor 610 to interface with peripheral devices.

As used herein, information may be "received" by or "transmitted" to, for example: (i) the platform 600 from another device; or (ii) a software application or module within the platform 600 from another software application, module, or any other source.

In some embodiments (such as shown in FIG. 6), the storage device 630 includes a historic database 660 (e.g., associated with past operations, results, etc.), an input database 700 (e.g., indicating refining process components, configurations, settings, etc.) and an output database 670. Moreover, various databases might be split or combined in accordance with any of the embodiments described herein. For example, the historic database 660 and/or input database 700 might be combined and/or linked to each other within the dynamic model 614.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications may be referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A method of using predictive analytics for control of an overhead crude section of a hydrocarbon refining process comprising:
   determining one or both of hydrogen chloride and amine conditions of an overhead crude section of a refinery at current operating conditions of the overhead crude section, wherein the current operating conditions comprise one or more operating conditions;

determining a plurality of fields of action by simulating a variation of at least one of the one or more operating conditions;

determining a risk indicator of salting for each field of action of the plurality of fields of action; and providing a recommended change in operation or chemistry of the overhead crude section to one of the plurality of fields of action while adhering to one or more constraints.

2. The method of claim 1, wherein providing a recommended change in operation or chemistry of the overhead crude section to one of the plurality of fields of action while adhering to one or more constraints comprises providing a recommended change in one or both of HCl and amine conditions of the overhead crude section.

3. The method of claim 1, wherein the one or more constraints involve salting temperature, water dew point temperature and tower top temperature of the overhead crude section.

4. The method of claim 3, wherein the salting temperature is constrained to be less than the water dew point temperature and tower top temperature.

5. The method of claim 1, wherein the overhead crude section comprises a distillation column and the one or more operating conditions comprise one or more of the distillation column's operating conditions.

6. The method of claim 5, wherein the one or more of the distillation column's operating conditions comprise one or more of overhead condenser temperature, overhead condenser pressure, reflux flow and steam flow.

7. The method of claim 1, wherein the one or more operating conditions comprise one or more of industrial fluid properties or boot water properties of the overhead crude section.

8. The method of claim 7, wherein the industrial fluid properties comprise properties of one or more of a refinery fluid, a production fluid, cooling water, process water, drilling fluids, completion fluids, production fluids, crude oil, feed streams to desalting units, outflow from desalting units, refinery heat transfer fluids, gas scrubber fluids, refinery unit feed streams, refinery intermediate streams, finished product streams, and combinations thereof.

9. The method of claim 7, wherein the one or more of industrial fluid properties or boot water properties of the overhead crude section comprise speciated amines, percent salt, chlorides, iron, and organic acids.

10. The method of claim 1, wherein determining the plurality of fields of action by simulating a variation of the at least one of the one or more operating conditions comprises using a physics model and probability distribution models on the at least one of the one or more of the operating conditions and the determined hydrogen chloride and amine conditions.

11. The method of claim 1, further comprising operating the crude overhead section in accordance with the recommended change in operation of the overhead crude section.

12. The method of claim 1, further comprising displaying to an operator safe zones or safe boundaries for operating the overhead crude section.

13. A system for using predictive analytics for control of an overhead crude section of a hydrocarbon refining process comprising:

a memory, wherein the memory stores computer-readable instructions; and a processor communicatively coupled with the memory, wherein the processor executes the computer-readable instructions stored on the memory, the computer-readable instructions causing the processor to:

determine one or both of hydrogen chloride and amine conditions of an overhead crude section of a refinery at current operating conditions of the overhead crude section, wherein the current operating conditions comprise one or more operating conditions;

determine a plurality of fields of action by simulating a variation of at least one of the one or more of the operating conditions;

determine a risk indicator of salting for each field of action of the plurality of fields of action; and provide a recommended change in operation or chemistry of the overhead crude section to one of the plurality of fields of action while adhering to one or more constraints.

14. A non-transitory, computer-readable medium storing instructions that, when executed by a computer processor, cause the computer processor to perform a method using predictive analytics for control of an overhead crude section of a hydrocarbon refining process, the method comprising:

determining one or both of hydrogen chloride and amine conditions of an overhead crude section of a refinery at current operating conditions of the overhead crude section, wherein the current operating conditions comprise one or more operating conditions;

determining a plurality of fields of action by simulating a variation of at least one of the one or more operating conditions;

determining a risk indicator of salting for each field of action of the plurality of fields of action; and providing a recommended change in operation or chemistry of the overhead crude section to one of the plurality of fields of action while adhering to one or more constraints.

* * * * *